J. S. BALLARD.
CORN PLANTER.
APPLICATION FILED APR. 3, 1912.

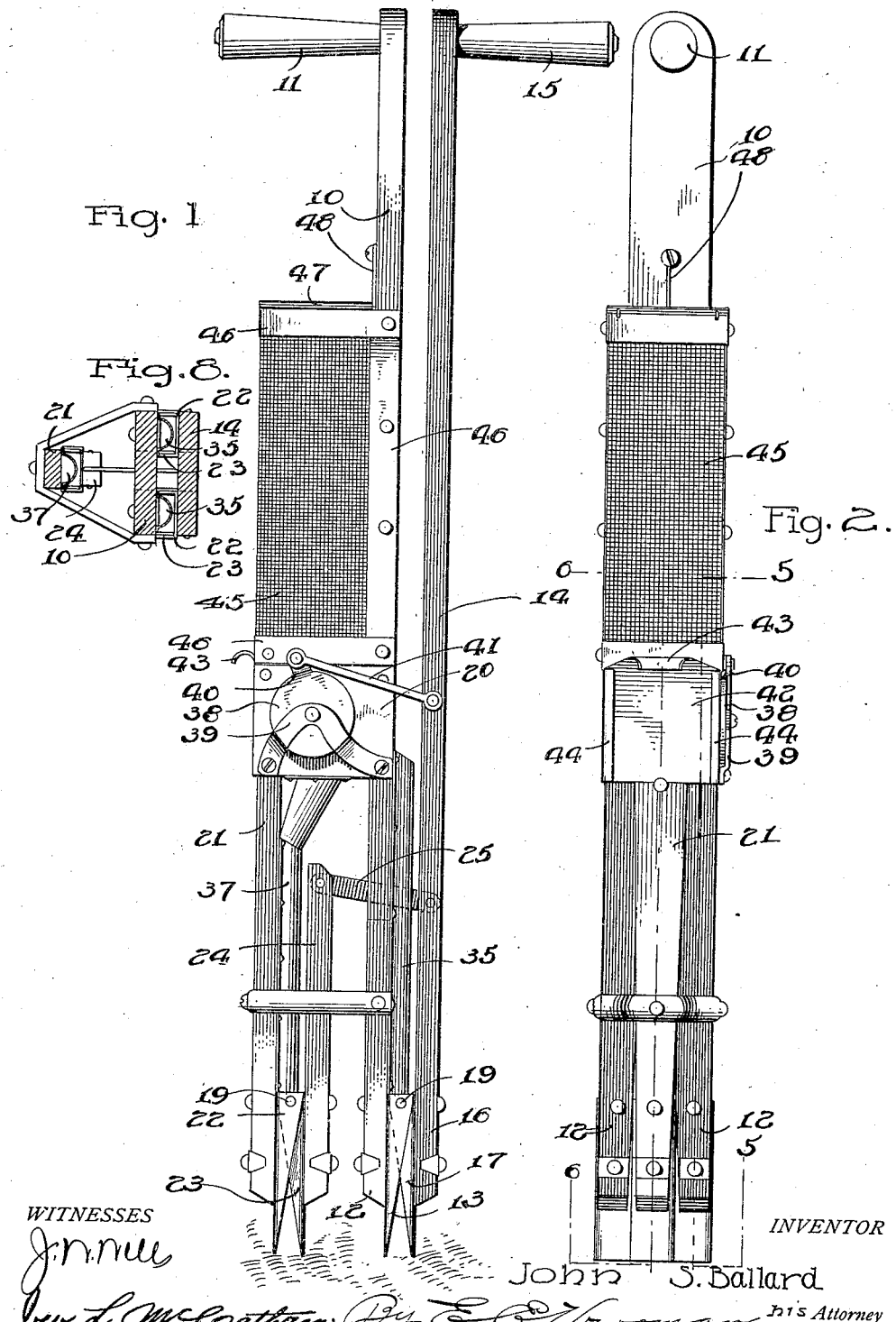

1,056,768.

Patented Mar. 25, 1913.

3 SHEETS—SHEET 2.

WITNESSES

INVENTOR
John S. Ballard
By his Attorney

J. S. BALLARD.
CORN PLANTER.
APPLICATION FILED APR. 3, 1912.
1,056,768.
Patented Mar. 25, 1913.
3 SHEETS—SHEET 3.
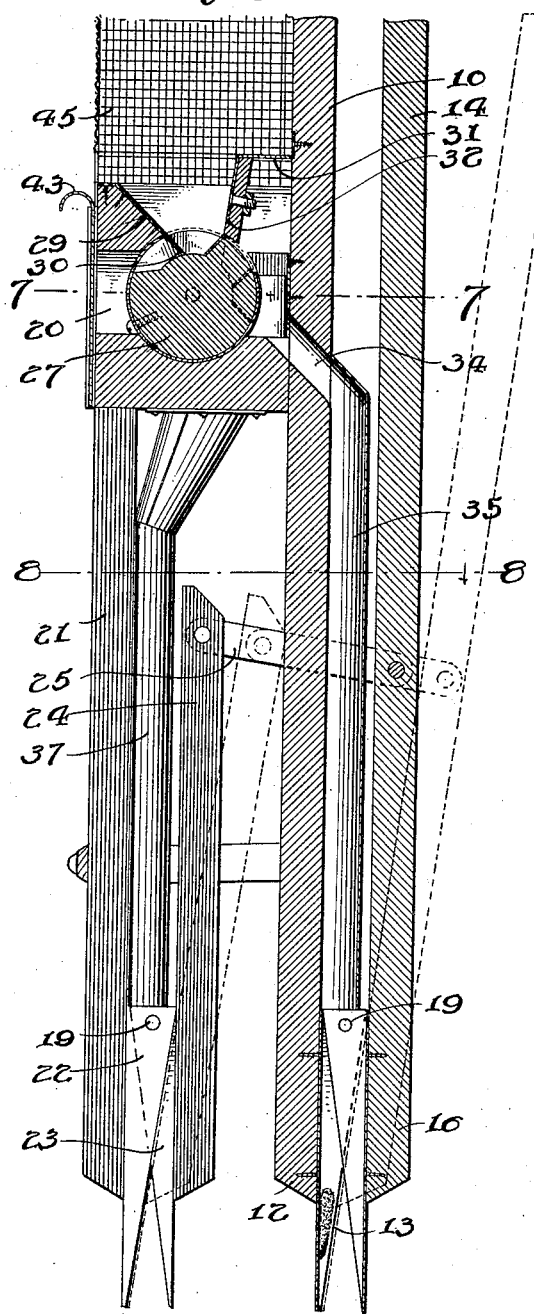
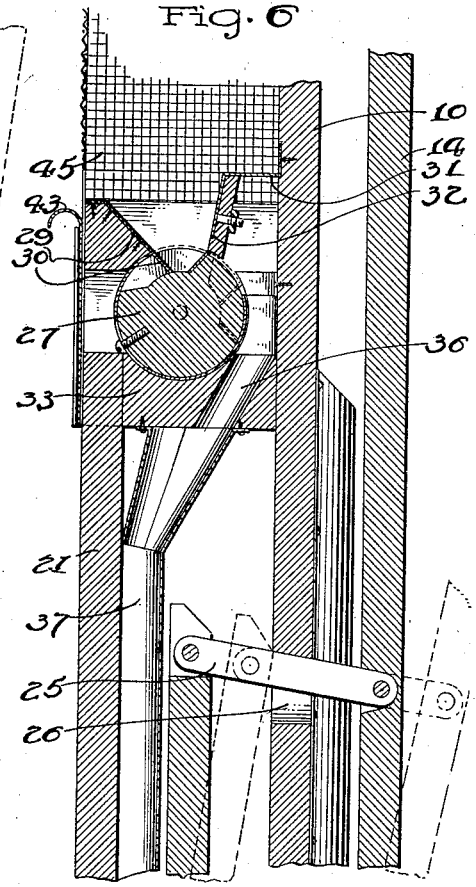
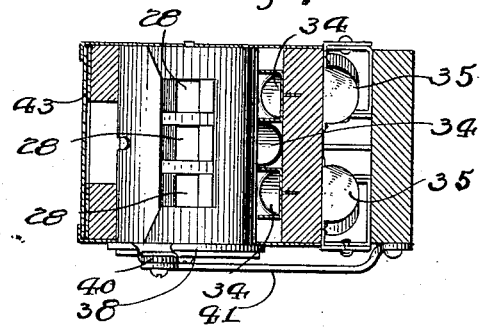
WITNESSES
INVENTOR
John S. Ballard
his Attorney

UNITED STATES PATENT OFFICE.

JOHN S. BALLARD, OF NORTH WATER GAP, PENNSYLVANIA.

CORN-PLANTER.

1,056,768.  Specification of Letters Patent.  Patented Mar. 25, 1913.

Application filed April 3, 1912. Serial No. 688,142.

*To all whom it may concern:*

Be it known that I, JOHN S. BALLARD, a citizen of the United States, residing at North Water Gap, in the county of Monroe and State of Pennsylvania, have invented certain new and useful Improvements in Corn-Planters, of which the following is a specification, reference being had therein to the accompanying drawing.

This invention relates to agricultural implements and has special reference to a corn planter.

The principal object of the invention is to so improve the general construction of corn planters that the grain will be deposited in a separated condition, thus permitting the free development of each stalk without crowding.

Another object of the invention is to provide means for filling the grain box with grain.

A third object of the invention is to provide separate means for planting the seed so that the ground will be broken up more readily than where a single means is employed and the operation will be furthermore a great deal easier.

With the above and other objects in view, the invention consists in general of certain novel constructions, combinations and arrangements of parts, as will be hereinafter fully described, illustrated in the accompanying drawings, and specifically claimed.

Figure 3:
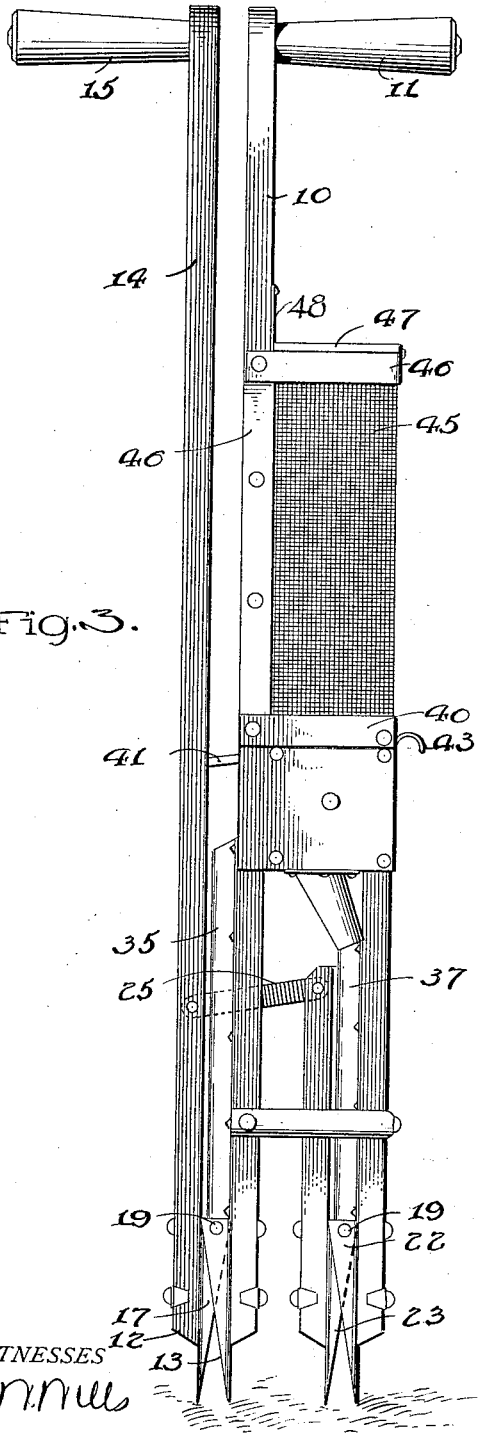
Figure 4:
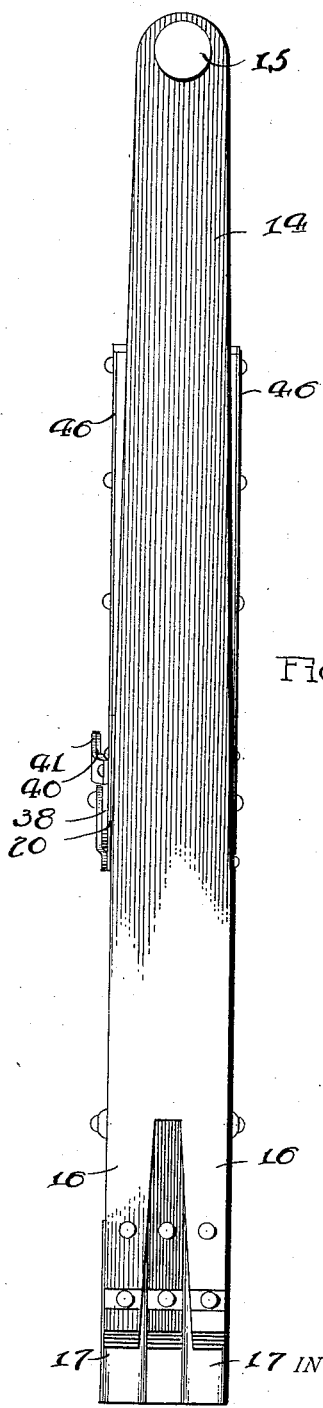

In the accompanying drawings like characters of reference indicate like parts in the several views, and Figure 1 is a side elevation of a corn planter constructed in accordance with this invention. Fig. 2 is a front view thereof. Fig. 3 is an elevation taken from the side opposite Fig. 1. Fig. 4 is a rear view of the device. Fig. 5 is a vertical section on the line 5—5, Fig. 2. Fig. 6 is a similar section on the line 6—6, Fig. 2. Fig. 7 is a section on the line 7—7, Fig. 5. Fig. 8 is a section on the line 8—8, Fig. 5.

In the present embodiment of the invention there is provided a main member 10 having at its upper end a handle 11. At the lower end this member is bifurcated to provide legs 12 and securely attached to the legs 12 are tapering jaws 13, the jaws being widest at their upper ends. There is also provided an operating lever 14 likewise having a handle 15 at its upper end and this operating lever and the main member are substantially alike in form and size, the member 14 being bifurcated to provide legs 16 at its lower end and having tapering jaws 17 secured to the bottom of these legs. The jaws 13 and 17 are pivotally connected at their upper ends as at 19 so that the lever 14 may have its upper or free end moved to or from the upper end of the main member 10, thus opening and closing the jaws 13 and 17. Extending forward from the main member is a casing 20 and depending from the forward edge of the casing bottom is a jaw-support 21 having a tapering jaw 22 similar to the jaws 13 and 17 carried at its lower end.

Pivoted to the jaw 22 is a coacting tapering jaw 23 and this jaw 23 carries a lever 24 which is connected to the lever 14 by means of a link 25, the latter passing through a suitable opening 26 formed in the main member 10. It will now be observed that as the lever 14 is operated to open or close the jaws 13 and 17 so in like manner will the jaws 22 and 23 be opened and closed simultaneously. It will thus be plain that if the jaws be closed and the points formed thereby be inserted in the ground and the handles moved together the jaws will be simultaneously opened in triangular spaced relation so that the seed contained therein will be dropped in small pockets in the soil which may be readily covered.

Considering now the delivery mechanism for the seed. Within the casing 20 is mounted a cylinder 27 which has on its periphery three spaced pockets 28. In the upper part of the casing 20 there is provided a downwardly inclined plate 29, the lower edge of which terminates in fingers 30 which enter the pockets 28. Secured to the member 10 is a plate 31 which has its forward edge inclined downward as at 32 and this forward edge terminates flush with the periphery of the cylinder 27 and, when the latter is in position to receive seed, the lower edge of the part 32 is in alinement with the walls of the seed pockets which extend longitudinally of the cylinder and lie adjacent the member 10. These two plates 29 and 32 serve to guide the seed into the pockets. The casing 20 is provided with a bottom 33 through which extends openings 34 which also extend through the member 10 and communicate with delivery tubes 35 carried on said member, the lower end of the tube 35 being received between the jaws 13 and 17. Through the bottom 33 also extends an opening 36 which inclines forwardly and opens into a delivery tube 37, the lower end of the latter terminating between the jaws 22 and 23. The end of the cylinder 27 is provided with a flange member 38 and over this member extends a bracket 39 which serves to hold the cylinder in proper position. The flange member 38 has an extension 40 projecting through one portion thereof and this extension 40 is connected to the operating lever 14 by means of a link 41 so that as the operating lever 14 is oscillated in like manner will the cylinder 27 be operated. Thus every time the jaws are closed seed will be delivered to the three delivery tubes 35 and 37, while when the jaws are open the cylinder will be in position to receive a further charge of seed.

In order to obtain access to the interior of the casing 20 there is provided a sliding door 42 having a handle 43. This door is mounted in guides 44 carried on the casing and may be drawn up when desired to permit access to the interior of the casing.

Above the door and forming the seed hopper there is provided a box, of wire screen material, as indicated at 45 and this screen is strongly reinforced at its edges, top and bottom by means of metallic strips or bands 48. Hinged to the front edge of the upper portion of the wire screen box is a lid 47 which is normally held closed by means of a spring 48' carried on the member 10 and extending downward into the wire screen box. By means of this style of box the operator can at all times see how much corn is left for planting, thus being able to tell when to refill the device.

In using the invention, it is operated in the same manner as the ordinary planter which plants a single bunch of seed close together. That is to say, the seed box having been filled, the handles are grasped and the points formed by the closed jaws inserted in the ground. The handles are then forced together and the seed will be dropped in the openings formed in the ground by the action of the jaws. The device is then withdrawn from the ground and the seed covered in any suitable manner. The operator then proceeds to the next hill meanwhile pulling the handles apart to close the jaws. This operation is repeated at each hill in succession until all the seeds have been planted, the seed box being replenished from time to time as necessity arises.

There has thus been provided a simple and efficient device of the kind described, and for the purpose specified.

Having thus described the invention, what is claimed as new, is:—

1. In a corn planter, a plurality of pairs of jaws, a frame supporting said jaws, a pivot connection between the jaws of each pair, a handle on said frame, an operating lever carried by one of said jaws, other operating levers carried by the remaining jaws, a link connection between said first-mentioned lever and the remaining levers, and a handle on the first mentioned operating lever.

2. In a corn planter, a plurality of pairs of jaws, a frame supporting said jaws, a pivot connection between the jaws of each pair, a handle on said frame, an operating lever carried by one of said jaws, other operating levers carried by the remaining jaws, a link connection between said first mentioned lever and the remaining levers, a handle on the first-mentioned operating lever, a seed box, an oscillatory seed delivery device in said seed box, and a link connection between the seed delivery device and the first-mentioned operating lever.

In testimony whereof I hereunto affix my signature in presence of two witnesses.

JOHN S. BALLARD.

Witnesses:
 JOHN B. WILLIAMS,
 MARY FLAGLER.

---

Copies of this patent may be obtained for five cents each, by addressing the "Commissioner of Patents, Washington, D. C."